United States Patent [19]

O'Neill

[11] 3,916,118

[45] Oct. 28, 1975

[54] STATION LOOP CONTROL ARRANGEMENT FOR TELEPHONE SWITCHING SYSTEM

[75] Inventor: John Francis O'Neill, Boulder, Colo.

[73] Assignee: Bell Telephone Laboratories, Incorporated, Murray Hill, N.J.

[22] Filed: Nov. 7, 1974

[21] Appl. No.: 521,650

[52] U.S. Cl. .............. 179/99; 179/15 AT; 179/18 J

[51] Int. Cl. .............................................. H04m 1/00

[58] Field of Search ............. 179/18 F, 18 FA, 18 J, 179/18 AD, 18 BC, 42, 99, 15 BY, 15 AQ, 15 AT, 84 R, 84 A, 81 R, 1 H

[56] References Cited

UNITED STATES PATENTS

| | | | |
|---|---|---|---|
| 3,239,610 | 3/1966 | Morse et al. | 179/99 |
| 3,420,961 | 1/1969 | Averill | 179/18 AT |
| 3,436,488 | 4/1969 | Barbato et al. | 179/99 |
| 3,519,757 | 7/1970 | Anderson | 179/18 J |
| 3,647,980 | 3/1972 | Fabiano | 179/99 |
| 3,715,516 | 2/1973 | Ebrahimi | 179/99 |
| 3,789,152 | 1/1974 | Medill et al. | 179/99 |

*Primary Examiner*—Thomas A. Robinson
*Attorney, Agent, or Firm*—H. R. Popper

[57] ABSTRACT

An arrangement for controlling the d.c. state of a subscriber's loop which has a port appearance in a time division switching network is disclosed. Because such a network provides no metallic path between the subscriber's line port and the trunk circuit, the abandonment of the call by the trunk circuit must be detected by a trunk scanner rather than by the line circuit directly and conventionally, a processor operation being required to interpret the scanner information. Heretofore a complex subscriber line circuit would have been required to respond to the processor operation so as to inform the station user that the call has been remotely abandoned. The present arrangement allows the processor to reoperate the ringing relay in the subscriber's line circuit during an interval when the group of line circuits including that of the affected subscriber would not normally receive active ringing. The ringing relay is equipped with back contacts that disconnect the subscriber's telephone set from the remainder of his loop circuit allowing the holding bridge in the subscriber's loop to be released and allowing the line scanner to inform the processor that the line is "on-hook". If the subscriber maintains the set off-hook when the ringing relay is released, the processor may properly return dial tone and respond to subsequent call signaling from the subscriber set.

12 Claims, 5 Drawing Figures

STATION LOOP CONTROL ARRANGEMENT FOR TELEPHONE SWITCHING SYSTEM

BACKGROUND OF THE INVENTION

This invention relates to time division telephone switching systems and more particularly to the implementation of key telephone service in time division private branch exchanges.

Time division PBXs conventionally employ solid state crosspoints which are operated for a fraction of a second called a time slot and which provide for the transmission of voice samples without, however, the ability to provide a d.c. or metallic conduction path between the subscriber's station port circuit and the trunk port circuit. The sleeve lead conventionally found in space division switching systems is also not normally present. This normally causes no undue problems when the switching network is simply handling ordinary telephone sets. However, when a key telephone set having a hold button and one or more illuminated line pick-up keys is served a problem arises which has been discussed in R. M. Averill, Jr. U.S. Pat. No. 3,420,961 issued Jan. 7, 1969. Briefly, when a call involving such a set is placed on hold by the key set user a holding bridge is inserted across the tip and ring conductors. The holding bridge is physically located in a key telephone unit that is interposed between the telephone set and the line circuit appearance in the switching network. A typical key telephone unit of the so-called 400-series type is shown in R. E. Barbato et al U.S. Pat. No. 3,436,488 issued Apr. 1, 1969.

The operating of the hold button at the key telephone set causes an A relay in the 400-series equipment to release and thereby insert the winding of a loop-monitoring L-relay in series with the holding bridge. When the station user removes the hold condition by operating the pick-up key for the line, the A relay is reoperated, the L-relay is released, and the holding bridge is removed. Other contacts of the A relay control other relays that steer the key button lamp illumination potential between a source of steady current when the line is picked up to a source of wink lamp illumination current when the line is placed on hold.

When such a holding bridge arrangment is employed in a conventional step by step or crossbar PBX and the call is abandoned by the party at the remote end of the trunk, the on-hook state of the trunk is reflected by a change in the d.c. state of the line circuit and the holding bridge is removed and the lamp illumination state changed to reflect the true state of affairs. When such a holding brige arrangement is employed with a time division PBX however the holding bridge is not released and the lamp illumination continues at the wink rate giving the station user the erroneous impression that the remote party is still being held.

Heretofore the problem has either been ignored or has required the use of the rather complicated special scan rate distinguishing circuitry disclosed in the above mentioned R. M. Averill, Jr. patent. In that patent, the line circuit was required to be provided with equipment to distinguish between the scanning rates present for held lines and the interruption of scanning by the processor when it determined that the call had been abandoned. It would be advantageous to provide a somewhat less complex arrangement at the line circuit for dealing with the changes occurring on the trunk side of the PBX network and for reflecting those changes at the station side.

It would also be advantageous to provide a means for releasing the hold bridge at a line circuit when the call is abandoned at the remote end of the trunk, or by the other party in an intercom call.

SUMMARY OF THE INVENTION

The foregoing and other objects of my invention are achieved in one illustrative embodiment in which the subscriber's line circuit is equipped with a ringing control relay that is normally operated by the central processor to apply ringing to the tip and ring leads of the subscriber's station. The ringing relay is advantageously provided with a back contact that normally isolates the ringing current from the line circuit transformer and thus from the time division hybrid.

In accordance with my invention, when the central processor detects that the call has been abandoned by the party at the remote end of the trunk circuit, either on the abandonment of a held condition or otherwise (since the difference cannot be distinguished), it reoperates the ringing control relay in the line circuit. The ringing control relay, however, is operated at a time when the ringing generator would normally not be connected to the line circuit, i.e., in the so-called silent interval of ringing. The back contact of the ringing relay, when operated under the control of the processor during the silent interval of ringing, interrupts the d.c. talking current to the subscriber's loop. The interruption in this current to the subscriber's loop causes the holding bridge to be released and lamp illumination to be switched from winking to steady just as if the holding bridge arrangement had been used with a line circuit appearing in a step by step or crossbar PBX. Moreover the break in the d.c. current occasioned by the reoperation of the ringing control relay and the release of the holding bridge by the key equipment circuits permits the line relay in the line circuit to report the line state as idle to the line circuit scanpoint where it is sensed by the scanner just as if it were an ordinary on-hook line served by the time division PBX.

The silent interval of ringing may be utilized in either of two fashions according to whether the ringing phase is assigned to a line by the processor from a register storing an indication of currently available idle ringing phases or whether ringing phase is predetermined by association of the line circuits in a group with a particular ringing phase bus. In either case ringing is frequently supplied to a group of line circuits through a common ring-trip and disconnect circuit. This invention also applies when a single common ringing voltage bus serves the entire system.

In the preferred embodiment ringing is assigned on the basis of currently available ringing phases, up to four lines in the group served by the common ring-trip and disconnect circuit may be rung, each of the lines receiving its active one second of ringing at a time. If less than four lines in the group are assigned to active ringing, there are idle ringing phases available. During any of these idle ringing phases, a line requiring call abandon correction may have its line circuit ringing relay operated just as if it were to receive active interval ringing but at the same time a disconnect relay is operated in the common ring-trip and disconnect circuit so that no ringing current is actually applied. This disconnect relay may be operated at this time because it corresponds to a portion of the silent interval for any of the other stations in the group because they are assigned other ringing phases. It is thus an aspect of this embodiment that another of the line circuits in the same group may be receiving normal ringing phase signals during the active phase of ringing while a particular line circuit in the group may have its ringing relay and the disconnect relay in the group ring-trip and disconnect circuit operated during the silent interval of that ringing phase to accomplish hold-abandon correction.

DESCRIPTION OF THE DRAWING

The foregoing and other objects and features of my invention may be better understood from the following description when read together with the drawing in which:

FIGS. 2 through 4 are to be arranged.

GENERAL DESCRIPTION

Figures 1, 5:
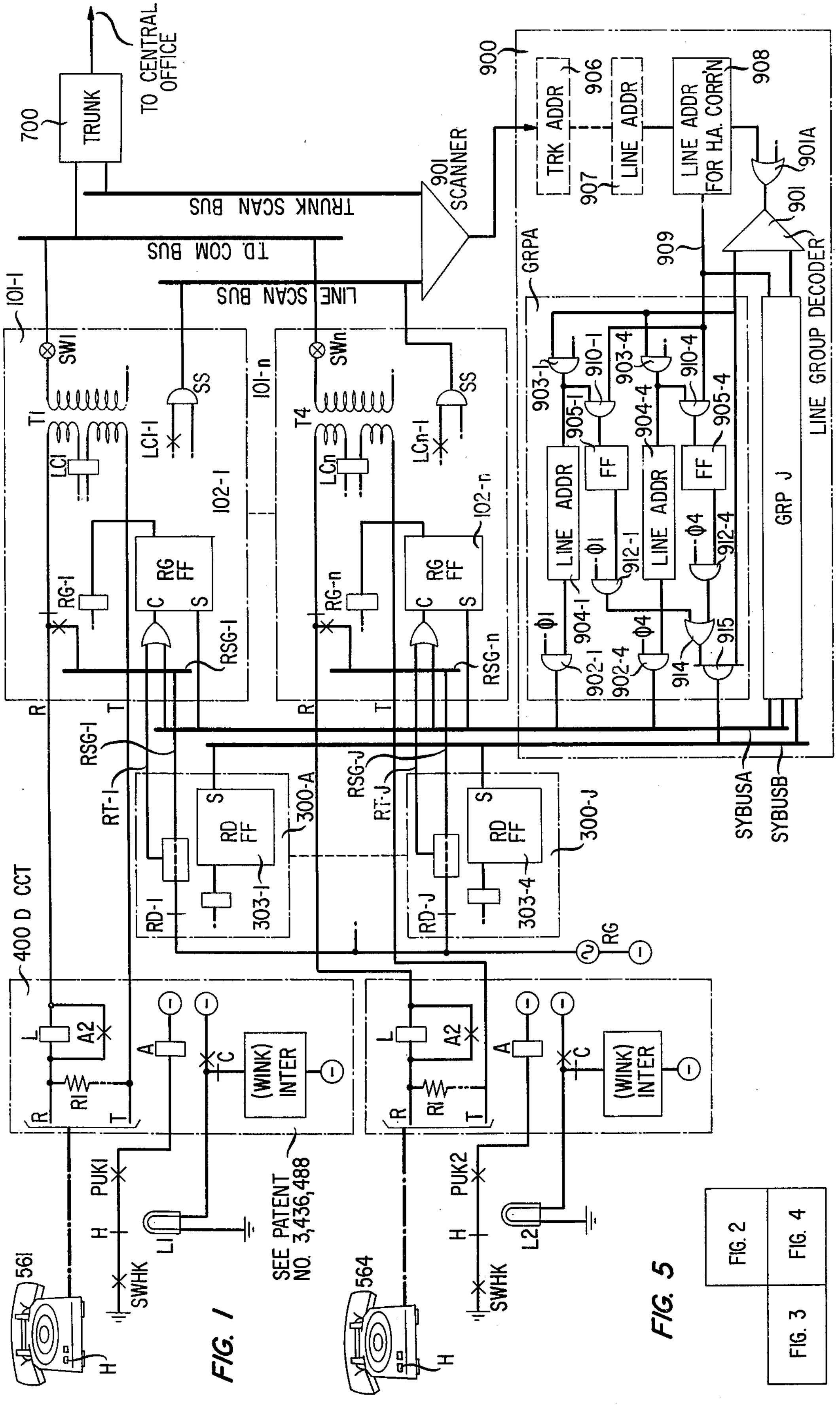
FIG. 1 is a block diagram of the groups of key telephone line circuits and the processor of a time division PBX arranged in accordance with my invention.
FIG. 5 shows how

Referring now to FIG. 1 there are shown the relevant portions of a time division private branch exchange arranged in accordance with one illustrative embodiment of my invention. Other aspects of the operation of the system shown are the subject of copending patent applications filed of even date herewith by D. J. H. Knollman Ser. Nos. 521,648 and 521,649 and D. G. Hill et al, Ser. No. 521,621. The telephone sets of the PBX are divided into several groups of which only telephone 561 of the first group and one telephone 564 of the last group are shown explicitly. Fully to illustrate the advantage of my invention the telephone sets are shown as being key telephone sets although some may also be ordinary, non-key sets. While keysets are usually equipped with a plurality of pick-up keys PUK-, for simplicity only a hold key H and one pick-up key PUK1 and PUK2, respectively, has been shown at each telephone set. Associated with the pick-up key (or button) shown at each telephone set is a respective button illuminating lamp L1, L2.

The line corresponding to the respective pick-up key at each of telephone sets 561, 564 is accorded access to the time division communications bus via a respective line circuit 101-1, 101-n. Each line circuit contains a hybrid and a filter circuit, not shown in detail, a coupling transformer T-, a time division switch SW- and digital control therefor operated by the central processor 900. The time division switch SW-, when operated, accords the line circuit access to the time division communications bus to other line circuits or to one of a plurality of trunk circuits such as trunk circuit 700. Additional information on the general operation of an illustrative time division PBX may be had by reviewing my prior joint patent with D. G. Medill, U.S. Pat. No. 3,789,152 issued Jan. 29, 1974.

Associated with the battery feed circuit at the primary winding of each line circuit's coupling transformer T1, T4 is a respective line relay LC1, LCn, whose respective contact, LC1-1, LCn-1, places a signal condition on the line scan point bus via line circuit gate SS to inform the processor 900 as to the switchhook state of the line. Likewise, each trunk circuit 700 provides a status input to processor 900 via trunk scan bus as well as having an appearance in the time division communications bus.

Figure 3:
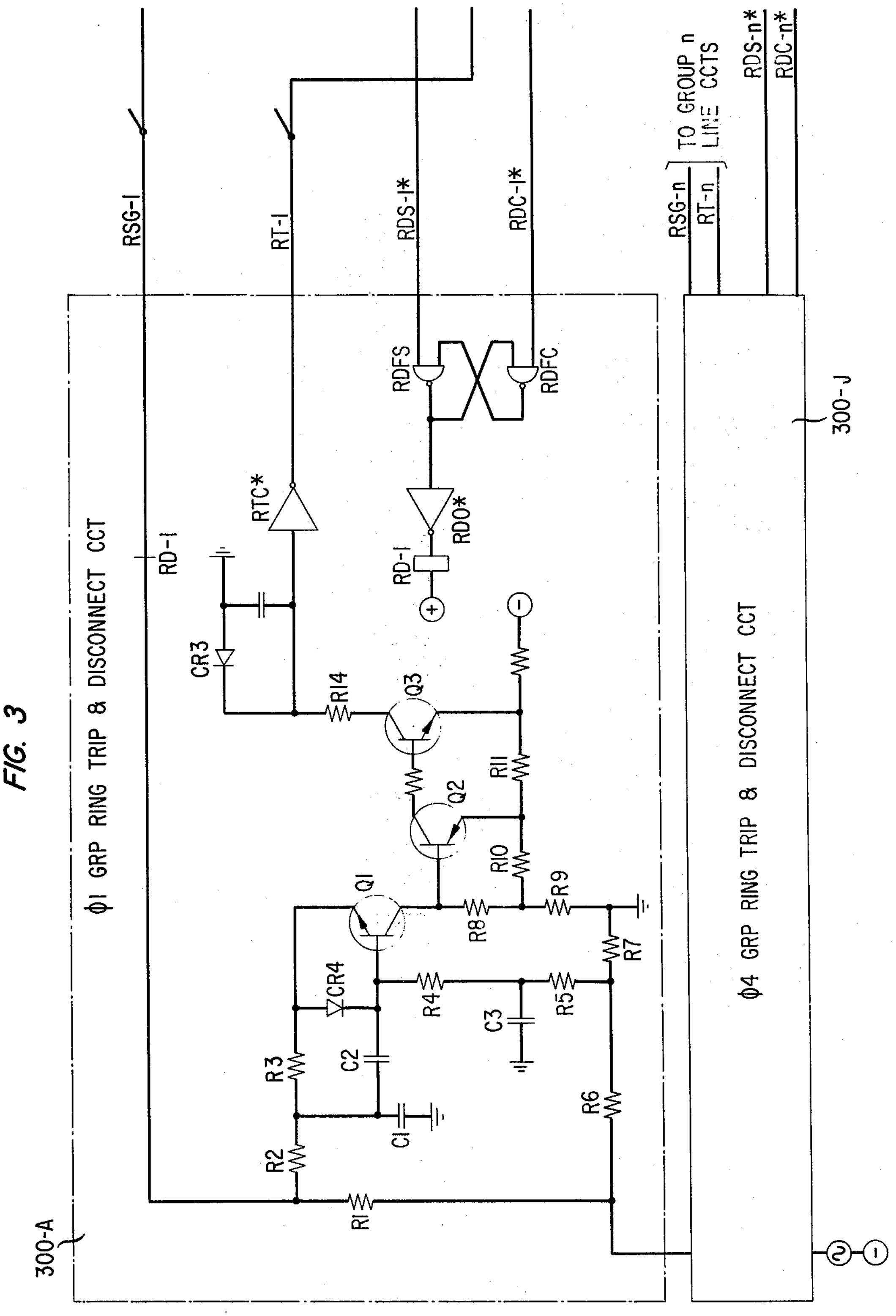
FIG. 3 shows the details of a group ring-trip and disconnect circuit.

The line circuits are assigned in groups so that a common ring-trip and disconnect circuit 300-A, 300-J may serve several line circuits. In one illustrative embodiment, a group may contain up to 32 line circuits. Details of the common ring-trip and disconnect circuit are shown in FIG. 3 and further discussion of other aspects of line circuit grouping may be had by consulting the disclosure of the aforementioned copending patent application of D. G. Hill, T. G. Lewis and P. Vachon entitled "Ringing Control Circuitry with Shared Ring Loop Current Detector," filed of even date hereof.

A common ringing generator RG may be employed to apply continuous ringing to all of the common ring-trip and disconnect circuits 300-A, 300-J in the illustrative PBX. In each of these circuits there is provided, in accordance with the principles of my invention, in series with the ringing supply lead RSG-1, RSG-J a respective back contact RD-1 RD-J whose function will hereinafter be described. The ringing generator lead from circuit 300-1 multiples to all of the other 31 station line circuits in the same group as line circuit 101-1.

Any line circuit in a group served by a particular group ring-trip and disconnect circuit such as circuit 300-1 may be selected to have ringing applied to its associated telephone set by the processor 900 addressing the S input of its respective ringing flip-flop, such as flip-flop 102-1 in line circuit 101-1. When the ringing flip-flop is set, the line circuit ringing relay, such as relay RG-1, is operated and at the make contact of its transfer contacts extends the continuity of the ringing generator lead RSG-1 to the ring lead R of the telephone set. When the line circuit ringing relay is operated the back contact of its transfer contacts prevents ringing current from flowing through coupling transformer T1.

Ringing current will normally be applied to the telephone set such as set 561 so long as flip-flop 102-1 remains set thereby maintaining ringing relay RNG1 operated. Since the normal ringing code is 1 second on followed by a silent interval of 3 seconds, four different stations in the group served by ring-trip and disconnect circuit 300-1 can effectively be rung in a 4-second interval. Similarly, four different telephone sets in the group served by ring-trip and disconnect circuit 300-1 may effectively be rung in any four-second interval. For example, if flip-flop 102-1 is operated during the first second of a four-second interval to apply ringing to telephone set 561 corresponding flip-flops of three other line circuits in the same group served by circuit 300-1 may be operated one during each of the next ensuing 3 seconds of the 4 second interval.

During the time that flip-flop 102-1 is set to maintain the line circuit ringing relay RG-1 operated, the d.c. state of the loop path to telephone set 561 is monitored by circuitry of circuit 300-1 represented by the dotted path (shown detailed in FIG. 3) between contact RD-1 and group ringing bus RSG-1. If, during the active interval of ringing for line circuit 101-1, the station user places telephone set 561 in the off-hook state, the switchhook contacts of set 561 will, in the conventional manner, complete a d.c. path to the ring conductor R. The presence of the d.c. path is detected by the circuitry represented by the dotted portion of the ring-trip and disconnect circuit and that circuit clears the ringing flip-flop by applying a clear signal to its input C. Details of the aforementioned ring-trip circuit are disclosed in FIG. 3.

Let it be assumed that one of the stations, not explicitly shown, which is served by one of the line circuits in the same group as line circuit 101-1 is to receive ringing during the first, one-second-long ringing phase. Ringing current is applied from ringing generator RG to circuit 300-1 and therethrough over back contact RD-1 to ringing bus RSG-1 which makes ringing current available to the 32 line circuits of the first group. Processor 900 as will hereinafter be more fully explained addresses the ringing control flip-flop in that line circuit and transmits a set command signal to the S terminal thereof.

The ringing control flip-flop when so set operates and maintains operated the line circuit ringing relay. The make contacts of the transfer contacts of this relay apply the ringing current from bus RSG-1 to the ring lead of the telephone set causing the bell in the set audibly to ring. At the end of the one-second interval, processor 900 readdresses the ringing control flip-flop in the line circuit, this time transmitting a clear command to the C terminal thereof. The flip-flop is reset causing the ringing relay to release and stop the audible ringing at the telephone set. The ringing control flip-flop will not again be addressed by processor 900 until the onset of the next four-second interval at which time an active one-second of ringing will again commence for this line circuit.

Let it be supposed that telephone set 561 is not a called telephone, as has been just described for another of the telephone sets in the group of line circuits served by circuit 300-1, but is a telephone that is involved in a communications connection with trunk circuit 700 and a distant party served by the central office at the remote end of trunk 700. Let it be further assumed that the station user at set 561 has placed the call on hold by operating the hold key H.

As is described in the aforementioned copending applications of D. J. H. Knollman filed of even date herewith, the hold condition in a time division switching system may be administered by the processor without the necessity of maintaining a physical hold bridge across the tip and ring conductors and if the key lamp illumination control circuitry is an integral part of the line circuit, as is there shown, no problems arise in controlling lamp illumination under the abandoned call condition.

However, the inclusion in the line circuit of digital logic circuitry capable of administering the hold condition and other key telephone service such as music on hold and common audible control is a "deluxe" type of telephone service whose availability to customers depends on their willingness to pay the higher tariffs charged therefor. For customers desiring to use the older, preexisting types of key telephone system technology, the well-known 400-series key telephones unit equipment manufactured by the Western Electric Company must still be provided. This type of relay control circuitry senses the continuity of the A lead on the key telephone set and provides a hold bridge across the tip and ring conductors when the A relay is released and also steers the appropriate lamp illumination currents to the pick-up key lamps of the telephone set.

Heretofore, the use of the 400-type key equipment in time division switching systems has resulted in a somewhat undesirable aspect of circuit operation in that when the party at the remote end of trunk 700 abandoned the call after the release of the A relay in the 400-type equipment inserted a holding bridge between conductors T and R, there was no easy way of changing the lamp illumination signal delivered through the 400-series equipment since there is no provision made in the 400-series equipment for use with common control equipment and specifically no way to connect the 400-series equipment to the processor which as described above has become aware of the abandonment of the call by its scanning of the trunks. One approach to the solution of this problem is disclosed in R. M. Averill patent No. 3,402,961 which employs a circuit for sensing differences in scanning rates.

In accordance with my invention, however, when the processor 900 ascertains via scanner 901 that trunk 700 has abandoned the call, it addreesses addresses ringing control flip-flop in the line circuit involved on the call during a time when the common ring-trip and disconnect circuit serving the line circuit is not involved in delivering ringing current to any other line circuit.

At the same time, processor 900 addresses the ring-trip and disconnect circuit 300-1 serving the line circuit and transmits a set command to the S terminal of its ringing disconnect flip-flop 303-1. The setting of flip-flop 303-1 operates ringing disconnects relay RD-1. The operation of ringing disconnect relay RD-1 at its back contacts prevents ringing current from being applied to any of the line circuits served by circuit 300-1.

Advantageously, the addressing of the ringing flip-flop 102 in the line circuit and of the ringing disconnect flip-flop 303-1 in the ring-trip and disconnect circuit 300-1 may be performed by a processor 900 under stored program control and in some applications this may be the preferred embodiment. To simplify the discussion, however, processor 900 is shown as containing hard-wired logic circuitry for accomplishing the addressing of the line circuit ringing control flip-flop during the silent interval of ringing.

Processor 900 contains a counter whose outputs $\theta 1$ to $\theta 4$ are successively activated at the onset of each 1-second interval to define intervals of active ringing. Normally the outputs of counter 901 control (multiple) output gates 902-1 through 902-4, in sequence, to gate the addresses of the four lines to be rung from registers 904-1 through 904-4 to the address leads of bus SYBUSA. At the same time an inpulse is delivered to the data lead (not explicitly shown) of bus SYSBUSA which is connected to the S input of the ringing control flip-flops 102-1 through 102-n of the line circuits 101-1 through 101-n. The address and data leads of bus SYBUSA are not individually shown in the drawing nor are the decoder circuits associated with line circuits 101-1 through 101-n inasmuch as the use of address and data leads are in a bus to line circuits and the use of decoders has been heretofore disclosed in my prior joint patent with D. G. Medill U.S. Pat. No. 3,789,152 issued Jan. 29, 1974.

When ringing is to be assigned to a called line, the number of the called line is applied by the processor to the line group decoder 901 via the lower input or OR gate 901A. The manner in which a processor obtains the number of a line required to be rung is, of course, well known in the art and need not be here described in detail. Accordingly, no circuitry is shown as being explicitly connected to the lower input of gate 901A. Line group decoder 901 decodes one or more of the digits of the line number address delivered to it through gate 901A to select a group of four ringing control registers serving the group of lines that includes the line requiring ringing. At the same time decoder 901 enters the number of that line into an idle one of line address registers 904-1. Line group decoder 901 decodes one or more of the digits of the line number address delivered to it through gate 901A to select a group of four-ringing control registers serving the group of lines that includes the line requiring ringing. At the same time decoder 901 enters the number of that line into an idle one of line address registers 904-1 through 904-4 via the upper input of a respective one of idle access gates 903-1 through 903-4 whose lower input is enabled by idle access control circuitry (not shown). Idle access control circuitry, sometimes referred to as lockout circuitry, being well-known need not be described herein.

Four line address registers are shown in each group so as to provide one register for each ringing phase. The contents of the line address registers are read out to the address bus when the respective ringing phase occurs. Thus, the contents of line address register 904-1 is read out to the address leads of bus SYBUSA during ringing phase $\theta 1$ and the contents of line address register 904-4 is read out during ringing phase $\theta 4$.

In the prior art patent to R. M. Averill Jr, U.S. Pat. No. 3,420,961 when the trunk scanner detected the on-hook condition of the trunk serving the remote party on a held call it signaled the processor (therein called a "controller") to discontinue sampling of the held line and a "missing sample" detector, which was provided as a part of the line circuit responded to the absence of sampling pulses to change lamp illumination from wink to steady. In my embodiment however, when the processor 900 is informed by the trunk scanner 901 that the trunk 700 serving the held call has gone on-hook it does not issue a command to alter the scanning of the held lines line circuit. Instead, the address of the line involved on the call with the trunk is obtained from line address register 907 and transferred to register 908 which is provided in accordance with my invention to hold the address of the line requiring hold abandoned correction. The contents of register 908 is then entered through the upper input of OR gate 901A to line group decoder 901 instead of through the lower input of gate 901A as was the case for a line requiring ringing. However, when an address is entered through the upper input of gate 901A, lead 909 is activated by register 908 responsive to its being loaded with the line address requiring hold abandoned correction. Decoder 901 selects the one of group A through group J register circuits that serves the particular line. The selection of one of the register circuits, such as the group A circuits enables the input AND gates 903-1 through 903-4 of the selected register group to receive the line address in the same manner as it did when operating to furnish the group A through group J register circuits with the address. of a line requiring ringing. The one of input AND gates 903-1 through 903-4 which is enabled at its lower input by the idle access circuitry (not explicitly shown) causes the contents of register 908 to be entered into an idle one of line address registers 904-1 through 904-4.

The enabled one of gates 903-1 through 903-4 enables a corresponding one of flip-flop input AND gates 910-1 through 910-4 which allows the associated one of flip-flops 905-1 through 905-4 to be set with an indication that its associated one of line address registers 904-1 through 904-4 contains not the address of a line requiring ringing but the address of a line to be processed for hold abandoned correction. Thus flip-flops 905-1 through 905-4 are only set for hold abandoned processing. The set one of flip-flops 905-1 through 905-4 permits the associated one of output AND gates 912-1 through 912-4 to be fully enabled on its respective ringing phase. When that ringing phase occurs, OR gate 914 passes an enabling signal to the upper input of address control gate 915. The lower input of address control gate 915 is enabled by the same output of line group decoder 901 which selected the appropriate one of group A through group J register circuits. When output gate 915 is thus enabled, it delivers a setting signal to the appropriate lead of SYBUSB that is associated with the set input S of the one of ring-trip and disconnect circuits 300-A through 300-J serving the line group containing the line having the abandoned hold condition. For example, if AND gate 915 in the group A register circuit is enabled corresponding to the entry of a line address requiring hold abandoned correction into any one of registers 904-1 and 904-5, gate 915 will deliver a set impulse during the corresponding one of ringing phases $\theta 1$ through $\theta 4$ to the set input S of flip-flop 303-1 in ring-trip and disconnect circuit 300-A. The setting of ringing disconnect flip-flop 303-1 causes relay RD-1 to be operated. The operation of relay RD-1 at its operated back contact disconnects superimposed ringing from bus RSG-1 serving the line group. The operation of ringing disconnect relay RD-1 in circuit 300-A does not remove active interval ringing from any of the group A line circuits since the address of the line requiring hold abandoned processing was entered into one of registers 904-1 through 904-4 not assigned an active ringing phase. The entry of that line number in the idle one of registers 904-1 through 904-4 causes the line address to be transmitted to SYBUSA through the associated one of output AND gates 902-1 through 902-4 during the corresponding one of ringing phases $\theta 1$ through $\theta 4$. In the manner previously described for the case when the address was that of a line requiring ringing, the application of the line address code to SYBUSA is decoded by the board and center-board decoders (not shown) associated with line circuits 101-1 through 101-n to deliver a setting signal to the S input of the addressed one of the ringing control flip-flops 102-1 through 102-n in the addressed one of the line circuits. The setting of that ringing control flip-flop such as flip-flop 102-1 of line circuit 101-1 causes its associated one of ringing control relay RG-1 to be operated. The operation of ringing control relay RG-1 at the make contact of its transfer contacts RG-1 connects the ringing bus RSG-1 to the ring lead of the line circuit but since the source of superimposed ringing has been disconnected from ringing bus RSG-1 by operation of relay RD-1 in circuit 300A, ringing is not applied to the line. At the operated back contact of its transfer contacts ringing control relay RG-1 interrupts the continuity of the ring lead R of the line circuit toward telephone set 561. Opening the ring lead opens the holding path for the L relay in the 400-D circuit allowing that relay to release. The release of the L relay in the 400-D circuit removes the holding bridge resistor R1 in the manner described in U.S. Pat. No. 3,436,488. Release of the L relay also causes the release of the C relay (winding not shown) whose transfer contacts C disconnect the source of (wink) interrupted lamp illumination from the key telephone set lamp L1 associated with pick-up key PUK1.

Accordingly, I have shown a means for re-employing the ringing control circuitry in the line circuit during an unassigned ringing phase for changing the continuity of the line circuit when the party at the remote end of the trunk has abandoned the cell. It will be noted that this arrangement uses much of the same circuitry as would be required to control a line for ringing and thus provides a superior alternative to prior art attempts to correct the hold abandoned condition.

Figure 2:
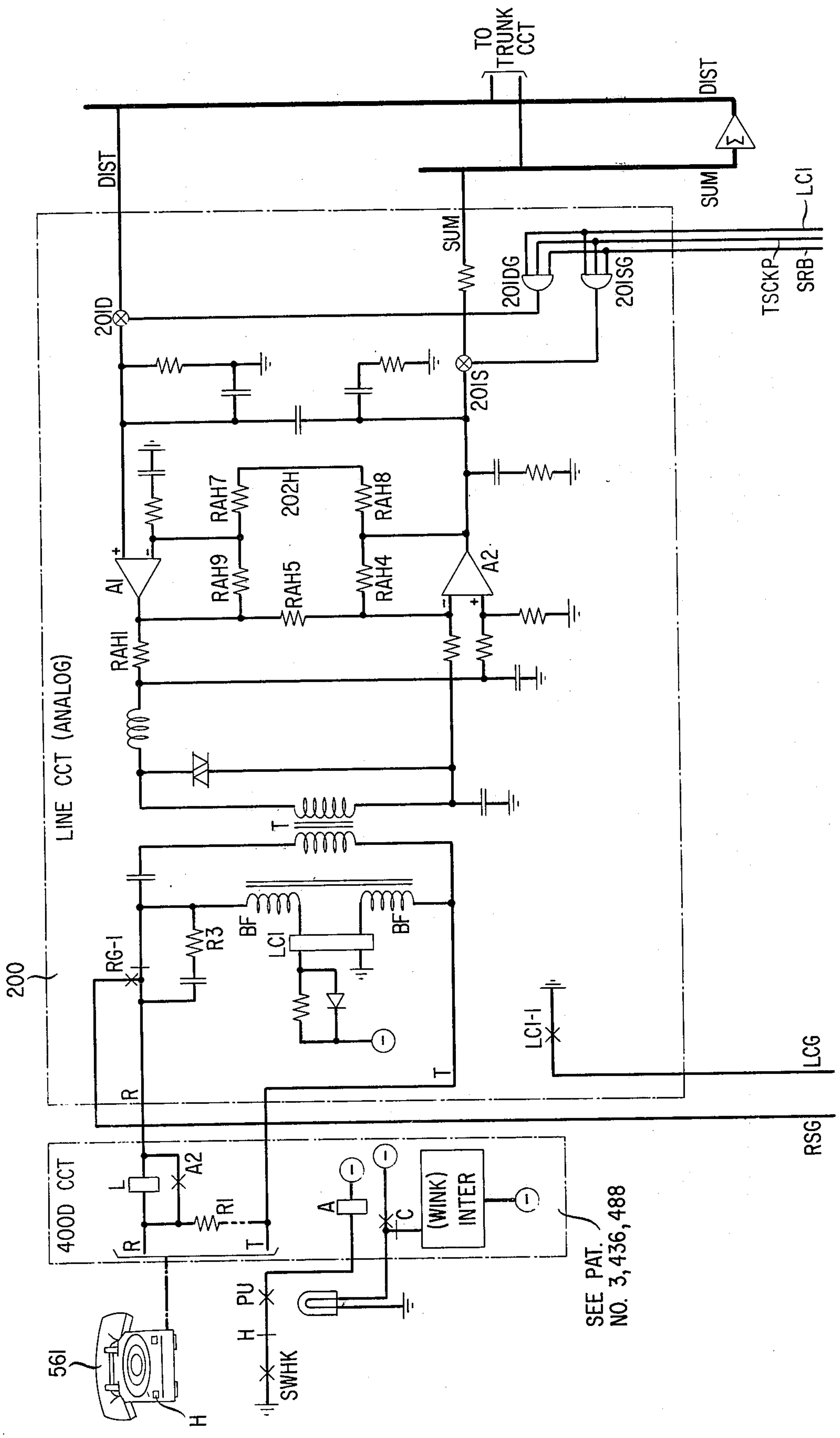
FIG. 2 shows the arrangement of a conventional key telephone set and prior art 400-type key telephone unit in association with the contacts of the line circuit ringing relay and other details of the line circuit appearing in an illustrative time division switching private branch exchange.
Figure 4:
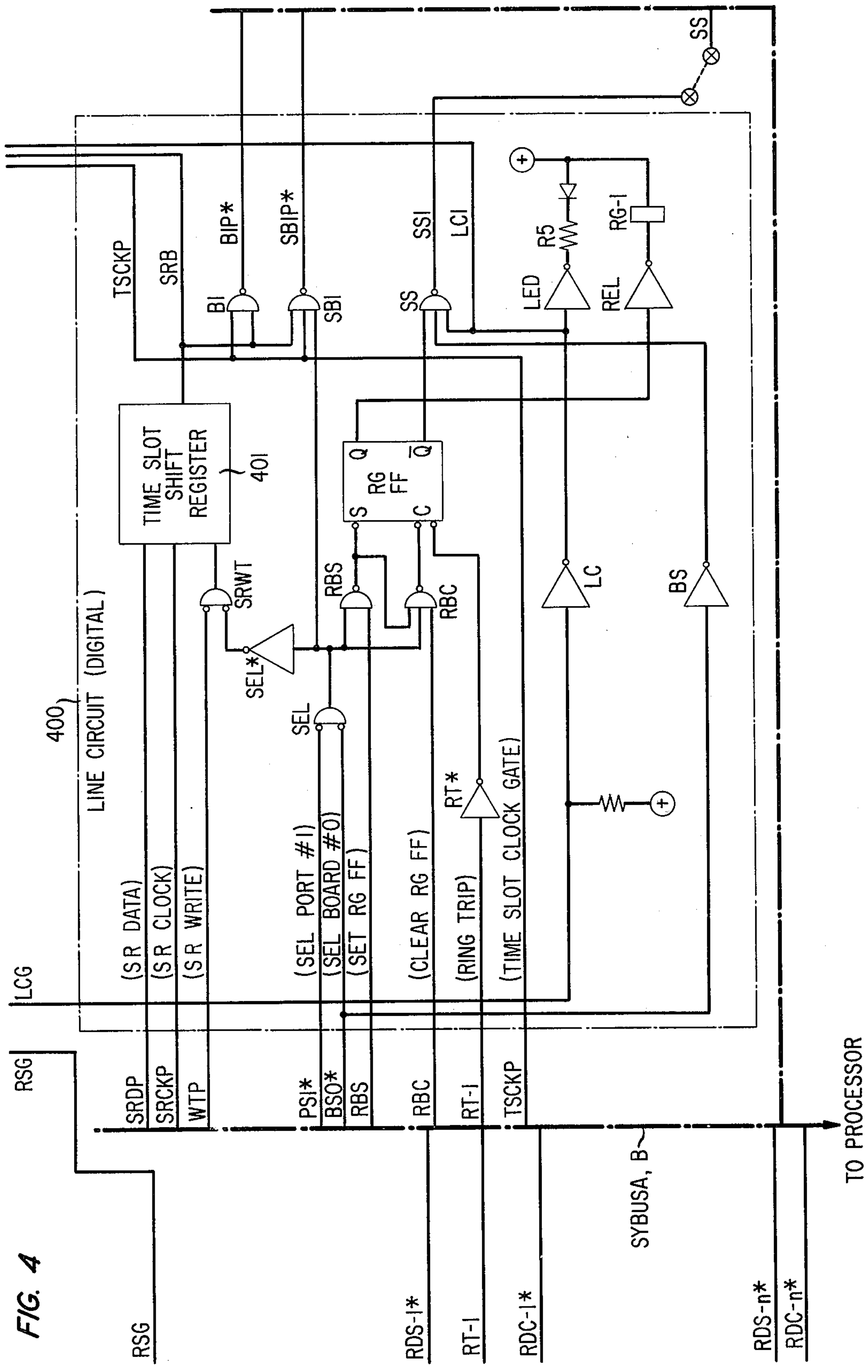
FIG. 4 shows the line port shift register ringing relay control flip-flop and interconnections to the data address buses of the time division switching system.

Further details of the analog and digital portions of the line circuit are shown in FIGS. 2 and 4 and the complete ring-trip and disconnect circuit serving a grup of 32 line circuits is shown in FIG. 3. FIGS. 2, 3, and 4 are to be arranged as shown in FIG. 5.

In FIG. 2 the telephone set 561 and 400-D key telephone unit have been repeated from FIG. 1. The line circuit of FIG. 2 contains a pair of hybrid amplifiers A1 and A2 which operate in conjunction with the time division switches 201D and 201S to extend two-way time sampling communications between the tip and ring TR, the line circuit loop and on time distribution buses SUM, DIST of the time division switching network. The description of the hybrid and the control of the time division switches 201D, 201S, being described elsewhere and not being a part of this invention, is omitted herefrom. In FIG. 2 the path for ringing is seen to extend from ringing supply bus RSG-1 over the make contact of the transfer contacts of ringing control relay RG-1 to lead R and the 400D circuit. Ringing current is continued over make contact A2 of the 400D circuit in the well known manner to the ringer of the telephone set 561.

When a hold condition is applied by the station user at telephone set 561, the operation of the hold key opens the continuity for the A relay in the 400-D key telephone circuit. The release of the A relay at its released make contact A2 inserts the winding of relay L in series with the ring lead as described in patent 3,436,488. The release of relay A through mesne circuitry, not shown, also inserts the holding bridge resistor R1 between the tip and ring conductors. So long as the holding bridge remains in the circuit, line relay LC1 in circuit 200 is maintained operated over a path which may be traced from ground at its lower winding, battery feed inductor BF the tip lead T to the 400-D circuit and the holding bridge circuitry therein indicated by the dotted path to resistor R1, the winding of relay L in the 400-D key telephone unit to the ring lead R, the released back contact of the ringing control relay transfer contacts RG-1 through the upper half of the battery feed inductor BF and the upper winding of line relay LC1 to battery.

As previously described in connection with FIG. 1, when the processor determines that the party at the remote end of the trunk circuit has abandoned the call, it applies a set signal to the S terminal of ringing control flip-flop RGFF, FIG. 4, which flip-flop when set operates ringing control relay RG-1. When relay RG-1, FIG. 4 is operated by the ringing control flip-flop RGFF, the back contact of its transfer contacts RG-1 opens the holding path for line relay LC1 and also for relay L in the 400-D telephone circuit. The release of line relay LC1 at its released make contact LC1-1 in the lower portion of circuit 200, FIG. 2, removes ground from lead LCG. Removal of ground from lead LCG enables the scan point bus input gate SS to deliver an on-hook signal to scan bus SS thereby informing the processor that the line is on-hook. As previously described, the release of relay L in the 400-D key telephone circuit allows the interrupted (wink) lamp illumination to be removed from the line lamp associated with circuit 200 on key telephone set 561.

The remaining circuitry in FIG. 4 including time slot shift register 401 and the busy/idle gate BI and the selected busy/idle gate SBI have been previously described in my above-mentioned U.S. Pat. No. 3,789,152 issued Jan. 29, 1974.

Referring now to FIG. 3, there is shown a first and a last of the ring-trip and disconnect circuits 300-A, 300-J, respectively, each for serving up to 32 line circuits. Each circuit, such as circuit 300-A, includes a current sensing resistor R1 in series between the source of 20-cycle superimposed ringing and the associated ringing supply bus RSG-1 that serves the group of line circuits. Capacitors C1, C2, and C3 have a low a.c. impedance at the 20 Hz ringing frequency as compared to resistors R2, R4, R5, and R7 and this network forms a filter at 20 Hz to render transistors Q1, Q2, and Q3 insensitive to the a.c. component of ringing. Resistors R6 and R7 form a voltage divider to ground with respect to the negative 48-volt battery of the superimposed ringing source that maintains their junction point less negative with respect to ground than resistors R2 and R3 connected to the emitter of transistor Q1. Accordingly, transistor Q1 is normally on. Resistors R9, R10, and R11 form a voltage divider such that when transistor Q1 is on, transistor Q2 will be turned on. Transistor Q2 in the on condition maintains transistor Q3 on and, in this condition, inverter RTC* maintains a low signal on lead RT-1. This low signal has no effect on the ringing control flip-flop RG of circuit 400, FIG. 4.

When the subscriber goes off-hook during the active interval of ringing, the d.c. current through current sensing resistor R1 back-biases transistor Q1 turning it off which in turn turns off transistors Q2 and Q3. Inverter RTC* at this time applies a high signal to lead RT-1. The high signal on lead RT-1 is applied through inverter RT* in circuit 400, FIG. 4, which applies a low signal to the C input of the ringing control flip-flop RGFF. The low signal resets flip-flop RG causing relay RG-1 to be released and, at the released make contacts of its transfer contacts RG-1 in FIG. 2, to disconnect the telephone set from bus RSG-1.

It should be noted that circuit 300-A detects answer only during the active interval of ringing since only during that interval is it connected to the ring lead R of the ringing telephone set. This causes no inconvenience however inasmuch as the ringing is immediately interrupted.

As previously described in connection with FIG. 1, circuit 300-A includes a ringing disconnect relay RD-1 having break contacts RD-1 in circuit with the ringing supply bus RSG-1. Relay RD-1 is operative by the flip-flop including cross-connected NAND gates RDFS and RDFC. Relay RD-1 is operated by the application of a low signal to lead RDS-1* by the processor and is cleared by the application of the low signal to the lead RDC-1*.

While I have thus shown an arrangement for dealing with the hold abandoned condition in a private branch exchange having a time division switching network controlled by a processor 900 having wired logic registers and gates arranged as shown in FIG. 1, it is to be understood that the connection of the line address registers to the gates may also be made under the direction of stored program control without departing from the spirit and scope of my invention.

In particular, my invention can be used in other types of systems, not making use of a centralized ring-trip detecting circuit, by causing the common ringing current generator to have a short interval of zero voltage, during which the ring relay can be activated on all circuits requiring hold abandon correction, thereby causing hold bridges in those lines to be removed. Further and other variations will become apparent to those of skill in the art.

What is claimed is:

1. In a switching system having a plurality of telephone sets, line circuits, and trunks, means for selectively interconnecting said line circuits with said trunks, and means for defining active intervals of ringing for a group of said line circuits, the combination comprising

- a ringing relay in each of said line circuits normally operable during a defined active one of said intervals for applying ringing current to its respective line,
- means for detecting an abandoned call condition, and
- means responsive to said detecting means and controlled by said defining means during the silent interval of said ringing in said group of line circuits for operating the ringing relay in the one of said line circuits connected by said time division bus to said trunk detected as exhibiting said abandoned call condition.

2. In a switching system according to claim 1, the combination wherein said means for defining said active intervals of ringing for said group includes a source of ringing control signals having predetermined phases, means for allocating said predetermined phases to lines of said group requiring ringing, and wherein said means responsive to said detecting means includes means for allocating a previously unallocated one of said ringing phases.

3. In a switching system according to claim 2, the combination further comprising

- a source of continuous ringing normally connected through an operated ringing relay in any of said line circuits to apply ringing to the associated one of said telephone sets, and
- means controlled by said means for allocating said previously unallocated one of said ringing phases for disconnecting said continuous ringing source during said last-mentioned one of said phases.

4. In a switching system according to claim 3, the combination wherein there is interposed between one of said telephone sets and its associated one of said line circuits a holding bridge, and wherein said ringing relay includes a back contact operable to disconnect said holding bridge from said line circuit.

5. In a switching system according to claim 4, wherein said line circuit includes a line relay, wherein said holding bridge is normally inserted to maintain said line relay operated when said telephone set has applied a holding condition to said line circuit, and wherein said back contact of said ringing relay when operated disconnects said line relay from said holding bridge.

6. In a switching system according to claim 5 the combination wherein said holding bridge includes a relay insertable in circuit with said line relay and normally operated during the continuance of a holding condition and wherein said back contact of said ringing relay is operable to release said holding bridge relay.

7. A line circuit including in combination, a line relay, a pair of tip and ring conductors for connecting said line relay to a telephone set, a ringing control relay having a set of transfer contacts including a make contact for normally applying ringing current to one of said pair of tip and ring conductors and a back contact for disconnecting said ringing current from said line relay, and means for operating said line relay during a predetermined interval of time when ringing current is not applied to said make contact.

8. A line circuit according to claim 7 wherein said means for operating said line relay includes flip-flop means settable to operate said ringing control relay and resettable to trip ringing.

9. In combination for serving a group of telephone sets, a source of superimposed ringing current; a ringing supply bus; switching means for normally connecting said source to said bus; a plurality of line circuits each including a pair of tip and ring conductors connectable to a respective telephone set; a line relay; a ringing control relay having a set of transfer contacts including a make contact operable to connect said ringing supply bus to one of said pair of tip and ring conductors and a back contact for disconnecting said line relay from said one of said conductors; and

- means for simultaneously operating said switching means to disconnect said source from said bus and for operating said ringing control relay of one of said plurality of line circuits.

10. The combination according to claim 9 further including holding bridge means interposed between one of said pair of tip and ring conductors and said line relay in one of said plurality of line circuits, said holding bridge means normally maintaining said line relay operated, and means including said ringing control relay back contact when operated for releasing said holding bridge and said line relay.

11. A telephone switching system having a plurality of line circuits each including a line relay, holding bridge means connectable to one of said line circuits to maintain the associated one of said line relays operated, a source of ringing voltage, means for defining a number of active intervals of ringing for a predetermined number of said line circuits, means for allocating said active intervals of ringing to connect said source to certain of said line circuits, means for detecting an abandoned call condition for said one of said line circuits, and means controlled by said detecting means for allocating an unallocated one of said active ringing intervals to said last-mentioned line circuit.

12. A telephone switching system according to claim 11 further comprising switching means controlled by said detecting means for disconnecting said source of ringing voltage from all of said line circuits during said unallocated one of said ringing intervals.

* * * * *

UNITED STATES PATENT OFFICE
CERTIFICATE OF CORRECTION

PATENT NO. 3,916,118

DATED October 28, 1974

INVENTOR(S) John F. O'Neill

It is certified that error appears in the above-identified patent and that said Letters Patent are hereby corrected as shown below:

Column 3, line 43 "521,621" should read -- 521,651--.
Column 6, line 28 "it addreesses addresses" should read -- it addresses--.
Column 9, line 20 "cell" should read -- call --.
Column 9, line 27 "grup" should read -- group --.
Column 10, line 65 "is it" should read -- it is --.

Signed and Sealed this

*second* Day of *March 1976*

[SEAL]

*Attest:*

RUTH C. MASON
*Attesting Officer*

C. MARSHALL DANN
*Commissioner of Patents and Trademarks*